US006583289B1

(12) United States Patent
McArdle et al.

(10) Patent No.: US 6,583,289 B1
(45) Date of Patent: Jun. 24, 2003

(54) CURATIVE FOR ANAEROBIC ADHESIVE COMPOSITIONS

(75) Inventors: Ciaran B. McArdle, Dublin (IE); Rory B. Barnes, Lucan (IE)

(73) Assignee: Loctite (R&D) Limited, Dublin (IE)

( * ) Notice: Subject to any disclaimer, the term of this patent is extended or adjusted under 35 U.S.C. 154(b) by 0 days.

(21) Appl. No.: 09/868,626

(22) PCT Filed: Jan. 7, 2000

(86) PCT No.: PCT/IE00/00002

§ 371 (c)(1),
(2), (4) Date: Jun. 26, 2001

(87) PCT Pub. No.: WO00/40664

PCT Pub. Date: Jul. 13, 2000

Related U.S. Application Data

(60) Provisional application No. 60/115,397, filed on Jan. 8, 1999.

(51) Int. Cl.$^7$ .................................................. C09J 4/00
(52) U.S. Cl. ....................................... 548/123; 526/205
(58) Field of Search ........................... 548/123; 526/205

(56) References Cited

U.S. PATENT DOCUMENTS

| 3,218,305 | A | 11/1965 | Krieble .................... 260/89.5 |
| 3,970,505 | A | 7/1976 | Hauser et al. ............... 156/331 |
| 4,029,586 | A | 6/1977 | Rossi et al. ................. 252/47.5 |
| 4,180,640 | A | 12/1979 | Melody et al. ........... 526/323.1 |
| 4,287,330 | A | 9/1981 | Rich ........................... 526/270 |
| 4,321,349 | A | 3/1982 | Rich ........................... 526/270 |
| 5,411,988 | A | 5/1995 | Bockow et al. ............. 514/560 |

FOREIGN PATENT DOCUMENTS

| DE | 1 817 989 | 9/1976 | ............. C09J/5/00 |
| DE | 276 286 | 2/1990 | ......... C07D/513/04 |
| EP | 377 927 | 7/1990 | ............. C09J/4/02 |
| JP | 73 008 757 | 12/1973 | |

*Primary Examiner*—Robert Gerstl
(74) *Attorney, Agent, or Firm*—Steven C. Bauman

(57) ABSTRACT

The present invention provides a new class of materials effective as curatives for anaerobic adhesive compositions. The addition of these materials into anaerobic adhesives as a replacement for conventional curatives, such as APH, surprisingly provides at least comparable cure speeds and physical properties for the reaction products formed therefrom.

12 Claims, No Drawings

CURATIVE FOR ANAEROBIC ADHESIVE COMPOSITIONS

This application claims the benefit of provisional application 60/115,397 filed Jan. 8, 1999.

BACKGROUND OF THE INVENTION

1. Technical Field of the Invention

The present invention relates to a novel curative for anaerobic adhesive compositions.

2. Brief Description of Related Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce cure may include saccharin, toluidines, such as N,N-diethyl-p-toluidine and N,N-dimethyl-o-toluidine, acetyl phenylhydrazine ("APH"), maleic acid, and quinones, such as napthaquinone and anthraquinone. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

In addition, other curatives for anaerobic adhesives include thiocaprolactam (e.g., U.S. Pat. No. 5,411,988) and thioureas [e.g., U.S. Pat. No. 3,970,505 (Hauser) (tetra methyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

There is an on-going desire to find alternative technologies to differentiate existing products and provide supply assurances in the event of shortages or cessation of supply of raw materials. Accordingly, it would be desirable to identify new materials which function as curatives for anaerobic adhesives.

SUMMARY OF THE INVENTION

The present invention provides a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom.

This class of materials may be defined as those within the following structure:

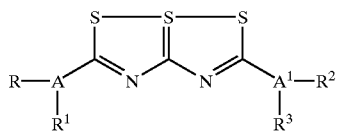

where A and A$^1$ may be selected from O and N;

R, R$^1$, R$^2$ and R$^3$ may be the same or different, and selected from hydrogen, alkyl, alkenyl, cycloalkyl, cycloalkenyl, and aryl, having from 1 to about 30 carbon atoms, and may be substituted or interrupted with a heteroatom, such as O, N or S, and heterocyclic structures, or R$^1$ and R$^3$, taken together, may join to form a cyclic structure having from about 20 to about 28 ring atoms, and together represent dialkyl substituted polyether structures that may be substituted or interrupted with the trithiadiaza pentalene structure, which itself may or may not be substituted by A$^1$, R$^2$, or R$^3$$_1$, as are defined above.

While certain compounds embraced by this formula are known [see German Patent Document No. 276 286; H. Graubaum et al., "Novel Crown Ethers with a Trithiadiazapentalene-Trithiotriuret Redox System", *Angew. Chem. Int. Ed. Engl.*, 36, 5, 1648–50 (1997); and C. T. Pedersen, *Sulfur Rpts.*, 1, 1 (1980) and Houben-Weyl, Thiemene-Verlag, Stuttgart (1994)], none seem to be known or suggested to confer the benefits described herein. Rather, their utility has been reported in the field of complexation of silver and mercury—such as for extraction purposes (see supra Graubaum).

This invention also provides methods of preparing and using the inventive anaerobic adhesive compositions, as well as reaction products of the compositions.

The present invention will be more fully appreciated by a reading of the "Detailed Description of the Invention", and the illustrative examples which follow thereafter.

DETAILED DESCRIPTION OF THE INVENTION

The present invention provides trithiadiaza pentalene materials as curatives for anaerobic adhesive compositions. The addition of these trithiadiaza pentalene materials into anaerobic adhesives as a replacement for conventional curatives surprisingly provides at least comparable cure speeds and physical properties for the reaction products formed.

The trithiadiaza pentalene materials may be defined as those within the following structure:

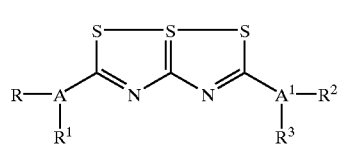

where A and A$^1$ may be selected from O and N;

R, R$^1$, R$^2$ and R$^3$ may be the same or different, and selected from hydrogen, alkyl, alkenyl, cycloalkyl, cycloalkenyl, and aryl, having from 1 to about 30 carbon atoms, and may be substituted or interrupted with a heteroatom, such as O, N or S, and heterocyclic structures, or R$^1$ and R$^3$, taken together, may join to form a cyclic structure having from about 20 to about 28 ring atoms, and together represent dialkyl substituted polyether structures that may be substituted or interrupted with the trithiadiaza pentalene structure, which itself may or may not be substituted by A$^1$, R$^2$, or R$^3$, as defined above.

Examples of such materials include:

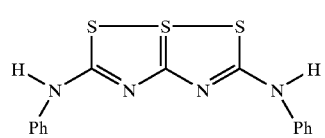

-continued

III
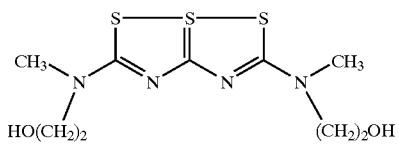

IV
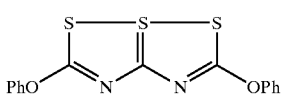

V
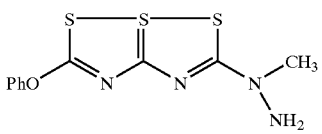

VI
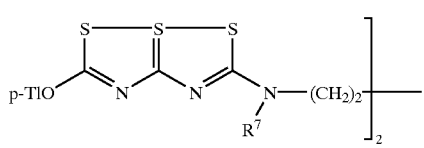

where $R^7$ is lower alkyl, such as methyl, ethyl, propyl and the like.

VII
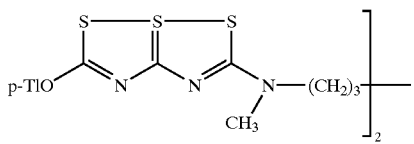

VIII
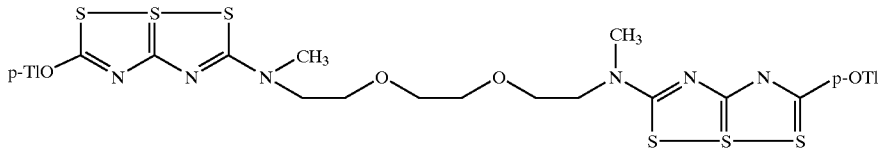

where Ph is

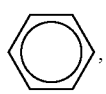, and p-TlO or p-Otl is

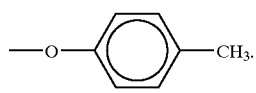.

Examples of crown ether trithiadiaza pentalene materials include:

IX
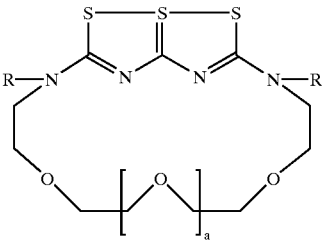

where R and $R^2$ are as described above, and a is an integer from 1–3.

Anaerobic compositions are based on a (meth)acrylate component, together with an anaerobic cure-inducing composition, such as one including the trithiadiaza pentalene materials of the present invention.

(Meth)acrylate monomers suitable for use as the (meth) acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A di(meth)acrylates, such as ethoxylated bisphenol-A (meth)acrylate ("EBIPMA").

Other (meth)acrylate monomers may also be used, such as reaction products of the diglycidylether of bisphenol-A with methacrylic acid and a (meth)acrylate ester corresponding to structure as shown below:

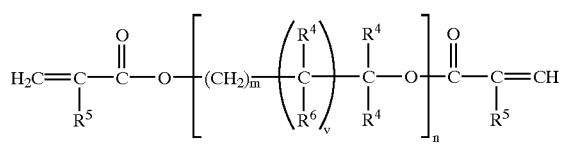

where R⁴ may be selected from hydrogen, alkyl groups having from 1 to about 4 carbon atoms, hydroxyalkyl groups having from 1 to about 4 carbon atoms or

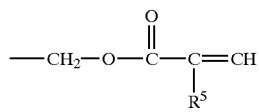

R⁵ may be selected from hydrogen, halogen, and alkyl groups of from 1 to about 4 carbon atoms;
R⁶ may be selected from hydrogen, hydroxy and

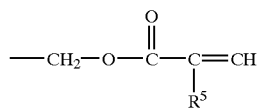

m is an integer equal to at least 1, e.g., from 1 to about 8 or higher, for instance, from 1 to about 4;
v is 0 or 1; and
n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic adhesives to alter the physical properties of either the formulation or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant reactive diluent, plasticizer, and/or mono- or poly-hydroxyalkanes, may be present in an amount within the range of about 1 percent to about 30 percent by weight, based on the total weight of the composition. When used, chelators may ordinarily be present in the compositions in an amount from about 0.001 percent by weight to about 0.06 percent by weight, based on the total weight of the composition.

The inventive compositions may also include other conventional components, such as free radical initiators, free radical accelerators and co-accelerators, inhibitors of free radical generation, as well as metal catalysts.

A number of well-known initiators of free radical polymerization are typically incorporated into compositions of the present invention including, without limitation, hydroperoxides, such as cumene hydroperoxide ("CHP"), paramenthane hydroperoxide, t-butyl hydroperoxide ("TBH") and t-butyl perbenzoate.

Such peroxide compounds are typically employed in the present invention in the range of from about 0.1 to about 10 percent by weight, based on the total weight of the composition, with about 1 to about 5 percent by weight being desirable.

Accelerators of free radical polymerization may also be used in conjunction with the trithiadiaza pentalene curatives. Such accelerators are typically of the hydrazine variety (e.g., APH), as disclosed in the '330 and '349 patents. Though one benefit of the present invention is that the trithiadiaza pentalene curatives render the use of such accelerators optional in preparing anaerobic adhesive compositions, they nevertheless may still be included.

Co-accelerators of free radical polymerization may also be used in the compositions of the present invention including, without limitation, organic amides and imides, such as benzoic sulfimide (also known as saccharin). [See U.S. Pat. No. 4,287,350 (Rich) and U.S. Pat. No. 4,321,349 (Rich).] The co-accelerators act in conjunction with the trithiadiaza pentalene curatives to aid in the anaerobic cure mechanism.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom.

The use of accelerators and/or co-accelerators may be in amounts of about 0.1 to about 5 percent by weight, such as about 1 to about 2 percent by weight, based on the total weight of the composition. Metal catalyst solutions or pre-mixes thereof are used in amounts of about 0.03 to about 0.1 percent by weight. Other agents such as thickeners, non-reactive plasticizers, fillers, and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. In addition, the compositions are particularly attractive as regards cure through volume, which ordinarily eludes conventional anaerobic adhesive formulations.

The compositions of this invention cure as their name connotes under anaerobic conditions by analogy to aforementioned thiourea based curatives (see e.g., U.S. Pat. Nos.

5,411,988 and 3,970,505; German Patent Document Nos. DE 1,817,989 and 2,806,701; and Japanese Patent Document No. JP 07-308,757). The trithiadiaza pentalenes used in this invention may be considered as a latent source of a thiourea curative. The latent form is inactive as regards aerobic cure; however, an active form is generated by redox chemistry. Other cure modalities may also be employed, if desired, provided of course appropriate choices are made for the components of the inventive compositions to render them curable under the desired conditions.

As with other anaerobic adhesive formulations, the compositions of the present invention are capable of curing in the substantial absence of air. However, unlike some anaerobic adhesive compositions, the compositions of this invention are capable of curing to form a reaction product at ambient environmental conditions, i.e., at room temperature, instead of requiring elevated temperatures. And while the so-formed reaction product forms an acceptable bond, that bond is capable of withstanding elevated temperature conditions by resisting thermal degradation.

In addition, this invention provides a method of preparing an anaerobic adhesive composition, the steps of which include mixing together a (meth)acrylate component and an anaerobic curative within structure I.

The invention also provides a process for preparing a reaction product from the anaerobic adhesive composition of the present invention, the steps of which include applying the composition to a desired substrate surface and exposing the composition to an anaerobic environment for a time sufficient to cure the composition.

This invention also provides a method of using as a curative for anaerobic adhesives compounds within Structure I.

And the present invention provides a method of using an anaerobic curative within structure I as a replacement for acetyl phenylhydrazine in anaerobic adhesive compositions.

In view of the above description of the present invention, it is clear that a wide range of practical opportunities is provided. The following examples are provided for illustrative purposes only, and are not to be construed so as to limit in any way the teaching herein.

EXAMPLES

The trithia diazapentalenes were obtained from Dr. Heinz Graubaum at the Institut for Angewandte Chemie Aldershof, Berlin, Germany.

Formulation of Anaerobic Adhesives

We prepared two formulations, each of which included a (meth)acrylate component (comprising TRIEGMA, acrylic acid and HPMA), and other components as set forth below in Table 1 in percent by weight:

TABLE 1

| Component | Pentalene A | Pentalene B | Control | Comparison |
|---|---|---|---|---|
| TRIEGMA | 13 | 13 | 13 | 13 |
| Acrylic Acid | 10 | 10 | 10 | 10 |
| HPMA | 70 | 70 | 70 | 70 |
| Pentalene | 5 | 5 | — | — |
| CHP | 2 | 2 | 2 | 2 |
| APH | — | — | — | 3 |
| Saccharin | — | — | — | 2 |

Pentalenes A and B are described by structure IX, where R and $R^2$ are benzyl, a is 1, and R and $R^2$ are $CH_3$. a is 2, respectively.

Initially, the compositions were prepared by adding with mechanical mixing at room temperature the appropriate amounts of the (meth)acrylate component, the pentalene or APH/saccharin combination, as appropriate, and the cumene hydroperoxide.

The components were mixed for an appropriate period of time to allow for dissolution and/or dispersion, as the case may be, of the solid components. The so-formed formulations were stored for further use by covering the beaker ensuring that an air pocket remained between the surface of the formulation and the cover.

The formulations in accordance with this invention show shelf-stability at room temperature in open containers over time.

Application and Ambient Temperature Cure of Anaerobic Adhesives

The sample formulations prepared as described above were applied in duplicate to five sets of degreased ⅜×16 brass (Substrate A), copper (Substrate B), mild steel (Substrate C), zinc bichromate-plated steel (white) (Substrate D) and zinc bichromate-plated steel (yellow) (Substrate E) fastener assemblies, which were then allowed to cure at room temperature for a period of time of about 24 hours. After the cure time, the fasteners were evaluated for tensile shear strength, data for which are shown below in Table 2.

TABLE 2

| | Tensile Strength (MPa) | | | |
|---|---|---|---|---|
| Substrate | Pentalene A | Pentalene B | Control | Comparison |
| A | 3.73 | 6.46 | 3.46 | 2.16 |
| B | 4.4 | 4.8 | 2.73 | 1.9 |
| C | 10.9 | 10.65 | 0.23 | 8.23 |
| D | 0.93 | 5.5 | fail | fail |
| E | fail | 2.23 | fail | 3.86 |

These data indicate that the formulations in accordance with this invention (i.e., Pentalene A and B) functioned at room temperature like traditional anaerobic (meth)acrylate-based adhesives when applied and cured on the substrates. More specifically, these data show the formulations to have particularly good bond strength (and even improved strength) on brass, copper, mild steel and certain zinc bichromate-plated steel.

While the present invention has been described herein by way of illustration and examples, it will be clear to those persons of skill in the art that changes and modifications may be made from the specific description without departing from the spirit and scope of the present invention defined by claims which follow hereinafter.

What is claimed is:

1. An anaerobic adhesive composition, comprising:
   (a) a (meth)acrylate component; and
   (b) an anaerobic cure-inducing composition comprising an anaerobic curative within the following structure:

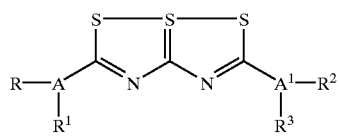

wherein A and $A^1$ is selected from O and N; and R, $R^1$, $R^2$ and $R^3$ are the same or different and are selected from alkyl, alkenyl, cycloalkyl, cycloclkenyl, and aryl, having from 1 to about 30 carbon atoms, and optionally substituted or interrupted with a heteroatom, and heterocyclic structures, or $R^1$ and $R^3$ taken together join to form a cyclic structure having from about 20 to about 28 ring atoms, and together represent dialkyl substituted polyether structures that are optionally substituted or interrupted with the trithiadiaza pentalene structure, which itself is optionally substituted by $A^1$, $R^2$, or $R^3$, as defined above.

2. The composition according to claim 1, wherein the (meth)acrylate component is represented by $H_2C=CGCO_2R_1$, wherein G is a member selected from the group consisting of H, halogen and alkyl having from 1 to about four carbon atoms, and $R_1$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

3. The composition according to claim 1, wherein the (meth)acrylate component is a member selected from the group consisting of silicone (meth)acrylate moieties, polyethylene glycol di(meth)acrylates, bisphenol-A-(meth)acrylates, ethoxylated bisphenol-A-(meth)acrylates, tetrahydrofuran (meth)acrylates and di(meth)acrylates, hydroxypropyl (meth)acrylate, hexanediol di(meth)acrylate, trimethylol propane tri(meth)acrylate, and an acrylate ester corresponding to the structure shown below:

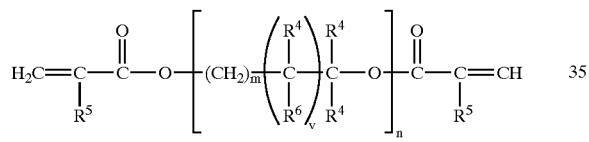

wherein $R^4$ may be selected from the group consisting of hydrogen, alkyl of 1 to about 4 carbon atoms, hydroxyalkyl of 1 to about 4 carbon atoms and

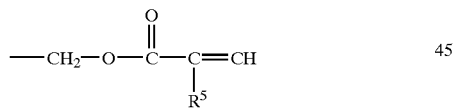

$R^5$ may be selected from the group consisting of hydrogen, halogen, and alkyl of 1 to about 4 carbon atoms;

$R^6$ may be selected from the group consisting of hydrogen, hydroxy and

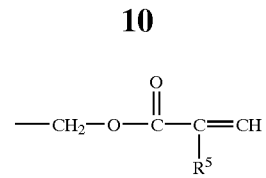

m is at least 1;
v is 0 or 1; and
n is at least 1;
and combinations thereof.

4. The composition according to claim 1, wherein the anaerobic curative is a trithiadiaza pentalene material represented by a member selected from the group consisting of:

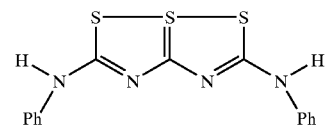

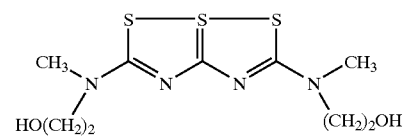

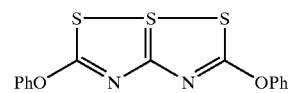

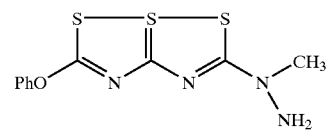

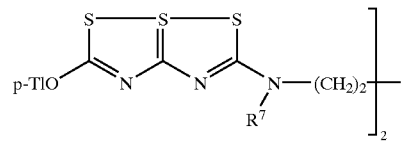

wherein $R^7$ is $C_{1-4}$ alkyl;

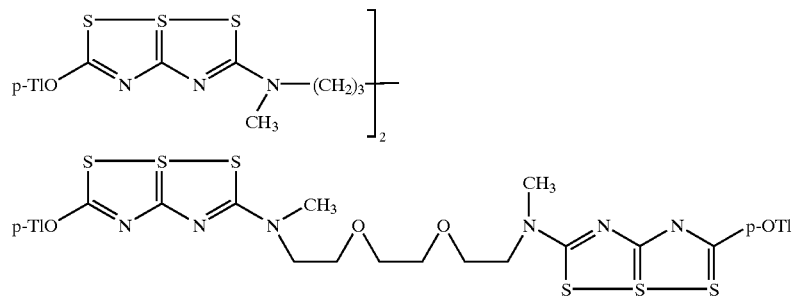

wherein Ph is

, and p-TlO or p-OTl is

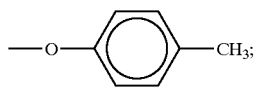;

and

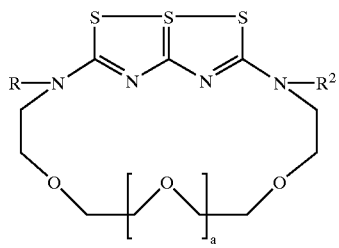

wherein R and $R^2$ are as described in claim 1, and a is an integer between 1–3.

5. The composition according to claim 1, wherein the anaerobic curative is

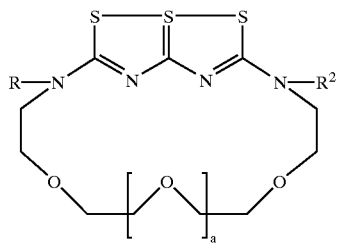

wherein R and $R^2$ are as described in claim 1, and a is an integer between 1–3.

6. A composition comprising anaerobically cured products of the composition according to claim 1.

7. A method of using as a curative for anaerobic adhesives compounds within the following structure:

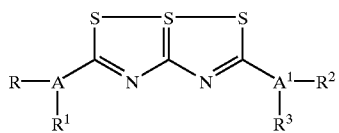

wherein A and $A^1$ are selected from O and N;
R, $R^1$, $R^2$ and $R^3$ are the same or different, and selected from hydrogen, alkyl, alkenyl, cycloalkyl, cycloalkenyl, aryl, having from 1 to about 30 carbon atoms, and optionally substituted or interrupted with a heteroatom, and heterocyclic structures, or
$R^1$ and $R^3$, taken together, join to form a cyclic structure having from about 20 to about 28 ring atoms, and together represent dialkyl substituted polyether structures that may be substituted or interrupted with the trithiadiaza pentalene structure, which itself is optionally substituted by $A^1$, $R^2$, or $R^3$, as defined above, a step of which comprises providing the curative for use with the anaerobic adhesive.

8. A method of preparing an anaerobic adhesive composition, comprising the steps of:
mixing together a (meth)acrylate component and an anaerobic curative within the following structure:

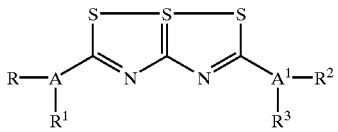

wherein A and $A^1$ are selected from O and N; and
R, $R^1$, $R^2$ and $R^3$ are selected from alkyl, alkenyl, cycloalkyl, cycloclkenyl, aryl, having from 1 to about 30 carbon atoms, and are optionally substituted or interrupted with a heteroatom, and heterocyclic structures, or
$R^1$ and $R^3$ taken together join to form a cyclic structure having from about 20 to about 28 ring atoms, and together represent dialkyl substituted polyether structures that are optionally substituted or interrupted with the trithiadiaza pentalene structure, which itself is optionally substituted by $A^1$, $R^2$, or $R^3$, as defined above.

9. The composition according to claim 1, further comprising a peroxide compound.

10. The composition according to claim 1, further comprising saccharin.

11. A method of using an anaerobic curative within the following structure:

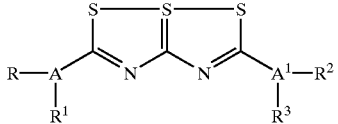

wherein A and $A^1$ are selected from O and N; and
R, $R^1$, $R^2$ and $R^3$ are selected from alkyl, alkenyl, cycloalkyl, cycloclkenyl, aryl, having from 1 to about 30 carbon atoms, and are optionally substituted or interrupted with a heteroatom, and heterocyclic structures, or
$R^1$ and $R^3$ taken together join to form a cyclic structure having from about 20 to about 28 ring atoms, and together represent dialkyl substituted polyether structures optionally substituted or interrupted with the trithiadiaza pentalene structure, which itself is optionally substituted by $A^1$, $R^2$, or $R^3$, as defined above as a replacement for acetyl phenylhydrazine in anaerobic adhesive compositions, a step of which comprises providing the curative for use in the anaerobic adhesive.

12. The composition according to claim 9, further comprising saccharin.

* * * * *

UNITED STATES PATENT AND TRADEMARK OFFICE
CERTIFICATE OF CORRECTION

PATENT NO. : 6,583,289 B1
DATED : June 24, 2003
INVENTOR(S) : McArdle et al.

It is certified that error appears in the above-identified patent and that said Letters Patent is hereby corrected as shown below:

Column 2,
Line 10, "…by $A^1$, $R^2$, or $R^3_1$, as…" should read -- … by $A^1$, $R^2$, or $R^3$, as… --.

Column 5,
Line 20, "$^R6$ may be…". should read -- $R^6$ may by… --.

Signed and Sealed this

Tenth Day of February, 2004

JON W. DUDAS
*Acting Director of the United States Patent and Trademark Office*